United States Patent [19]

Howland

[11] Patent Number: 4,877,260

[45] Date of Patent: Oct. 31, 1989

[54] ANTI-TIP WHEELCHAIR ACCESSORY

[76] Inventor: Frank S. Howland, 1187 Hillside Ave. 1 B9, Niskayuna, N.Y. 12309

[21] Appl. No.: 278,325

[22] Filed: Nov. 30, 1988

[51] Int. Cl.[4] ............................ B62B 5/02; A47C 1/02

[52] U.S. Cl. ................................ 280/304.1; 280/304; 297/DIG. 4

[58] Field of Search ............... 280/250.1, 304.1, 288.4, 280/293, 295, 304; 297/DIG. 4, DIG. 10; 248/346

[56] References Cited

U.S. PATENT DOCUMENTS

| | | | |
|---|---|---|---|
| 2,521,330 | 9/1950 | Berra | 280/11 |
| 3,848,883 | 11/1974 | Breacain | 297/DIG. 4 |
| 3,985,389 | 10/1976 | Bonfield | 297/DIG. 4 |
| 4,125,269 | 11/1978 | Kiel | 297/DIG. 4 |
| 4,565,385 | 1/1986 | Morford | 280/289 WC |
| 4,690,364 | 9/1987 | Constantin | 248/503.1 |

*Primary Examiner*—Charles A. Marmor
*Assistant Examiner*—Donn McGiehan
*Attorney, Agent, or Firm*—Schmeiser, Morelle & Watts

[57] ABSTRACT

A wheelchair anti-tip mechanism including an adjustable base that is bolted to the lower frame of a wheelchair inside of the wheels and below the center of gravity. Telescoping legs are placable into the sides and rear of the base in an outrigged fashion and are capable of extension out from and retraction into the base. The forward legs are adjustable and, when extended provide sufficient tilt toward the rear outrigged legs so as to raise the main wheels of the wheelchair off the ground. Once the wheelchair is rigged with the legs, and the forward legs adjustably extended, it becomes practically impossible for an unattended occupant to tip over the chair. When not in use, the legs may be stowed in the rear portion of the adjustable base.

7 Claims, 3 Drawing Sheets

13
14
16
18
22
24
26
28
38
40
42
43
44
32
36
42R
42L
S-S'
S
S'

ANTI-TIP WHEELCHAIR ACCESSORY

BACKGROUND OF THE INVENTION

1. Field of the Invention

The present invention relates generally to wheelchair accessories and, more particularly, to an anti-tip wheelchair attachment which, when engaged, renders an occupied wheelchair incapable of tipping over or of propulsion by its main wheels. The invention, therefore, may be defined Properly as a wheelchair stabilizer.

2. Description of the Prior Art

Wheelchair usage, regardless of the specific purpose, normally envisions some form of attendance to the occupant. In situations where the occupant need not be attended, the instant invention, although it may be attached to the lower frame of the wheelchair, would provide no benefit and, in all probability, its engagement would appear senseless. However, in the many instances when a wheelchair occupant must be attended, the instant invention most surely should be used because an attendant is often distracted or called away from the immediate vicinity of the occupied wheelchair. There are numerous instances on record wherein wheelchair occupants have either inadvertently, or intentionally, tipped over the chair. Most often this is done by thrusting the upper torso backward so that the center of gravity of the occupant-chair passes well aft of and over the chair's main wheel axis. In cases involving an agitated patient, most often a mental patient, it is known that violent side-to-side movements by the occupant have readily tipped conventional wheel chairs. The instant inventor, engaged in constructing wheelchair accessories, herein discloses a device which will allow a wheelchair occupant to be left unattended for short periods, so that the chair itself will be rendered immobile and virtually nontippable. Thus, it is to prior art that discloses restraining devices, anti-tip devices or tilting and nontilting apparatus that the reader's attention is now drawn.

In U.S. Pat. No. 2,521,330, issued in September 1950, A. H. Berra et al. disclosed a SLED RUNNER ATTACHMENT FOR BABY BUGGIES. The attachment of Berra is inwardly rigged, that is, attached to the lower frame of the buggy inward of the main wheels. Unique in this invention is the adaptation of an articulable quadrilateral frame of which the sled runner comprises one side. When the frame, bearing the runner, is moved from its folded parallelogram shape to the extended full rectangular shape, the runner engages the ground and, the rectangular sides being longer than the distance from the main wheel axis to the ground, lift the wheels of the buggy off the ground. Thus, Berra discloses a movable apparatus which uniformly and simultaneously lifts all wheels of the vehicle from off the ground, providing it with greater mobility over the particular medium (ice or snow) on which it glides.

Constantin, in U.S. Pat. No. 4,690,364, issued September 1987 discloses a mechanism for locking a wheelchair in a moving vehicle and is entitled WHEELCHAIR RESTRAINING DEVICE. Notably in this invention, the inventor employs a framework comprised of a pair of parallel bars, joined one to the other in an "H" configuration, and having at the ends thereof telescoping, adjustable clamp members for engaging the lower frame elements of a wheelchair. Once the Constantin invention is bolted to the frame of the chair, inward of the main wheels, it is then disposed over and brought into contact registry with the mounting plate assembly that has been secured to the floor of a vehicle, such as a van. Thereafter, the invention's "H" frame engages the van assembly and the wheelchair is restrained in the position where the mechanism is engaged. The invention affords constraint of the chair so that it cannot easily tilt; indeed even a modest accident will not disjar the chair from the Constantin device. It nonetheless cannot be used readily in the vast majority of cases where wheelchairs are employed. Generally, a wheelchair is employed in a environment that allows most of the occupants, whether attended, to move about freely. In the cases of the attended patients, to employ a device such as that taught by Constantin would require myriad emplacements of the (van anchoring) apparatus about hospitals, health care facilities and nursing home grounds. Thus, although this invention has a high degree of specialized usage, its general employment is impractical. What is especially noteworthy about the Constantin disclosure, however, is the fact that the inwardly rigged apparatus, because of its constraint to the ground (floor of the van), is remarkably stable. After a diligent search of the prior art, the applicant concluded that there is no existence of an inwardly rigged wheelchair constraint or stabilizer, other than that art disclosed by Constantin, that would afford the safety and security of the applicant's invention.

Lastly, U.S. Pat. No. 4,565,885, issued to Morford in Jan. 1986, discloses a tiltable supporting wheelchair having a tilting mechanism with front support wheels that pivot downward, outwardly engaging the floor (or ground) and which raise the front of the wheelchair so as to tilt it backwards, This mechanism includes a cross-frame pivotably attached to the frame of the wheelchair and actuated by movement of a lever-linked arm which is attached to it. Contrary to the instant applicant's invention, the Morford device does not stabilize the wheelchair, but rather tilts it back slightly. This retains full mobility of the chair but is done in order to grant relief (from traditional upright sitting positions) to a patient who must reside in the chair for extended periods.

There continues to exist, in the wheelchair art, a need for an easily attachable, readily removable apparatus that will allow a wheelchair attendant to alone immobilize an occupied wheelchair in a position of absolute stability so as to insure that, regardless of the body motions of the occupant, the chair cannot be made to tip over by the occupant.

SUMMARY OF THE INVENTION

The present invention provides the solution to the long felt need, in public and private institutions throughout the country, for a means for temporarily immobilizing an occupied wheelchair and, concurrently, assuring that patient motions will not tip the chair.

The instant invention comprises, first, an adjustable base, ideally a quadrilateral framework consisting of a back portion or brace, a front portion and two lateral portions; the lateral portions telescope into and out of the front and rear portions. Next, at the four corners of the aforementioned base there are open ends or ports receptive of at least four legs. The legs are "L" shaped. The adjustable base has at least four ports, often six, disposed at the lateral ends of its front portion and at the lateral, as well as rear face, of its rear portion. These ports are made so as to insertably receive one arm of an "L" shaped leg. Thus, in the front portion of the adjustable base, one of the legs may be inserted in each side of the base coextensive with the front bracket or portion and, correspondingly, a pair of legs may be inserted into the base rear bracket or portion, either at the sides thereof or, alternately, at the rear face. Thus, in the latter configuration, the back or rear leg pair would be inserted orthogonal to the front leg insertion pattern. Unique to the front legs only are press-down or step-down adjustable foot mechanisms. Each mechanism allows an extension of a front leg by physically adding an adjunct footing to the free arm of the leg. When all legs are installed in the adjustable base, and the adjuster mechanism is used to lengthen the front legs, the consequence is a tilting of the adjustable base's plane towards the rear of the chair. The degree of tilt is rather slight, a greater tilt being eschewed by the instant inventor for fear of raising the front of the chair too high. In its operative mode, the apparatus is removably fixed to the lower lateral frames of the conventional wheelchair by suitable means, such as bolting thereto. Thus, the plane defining the base of the wheelchair is made practically contiguous and coplanar to the plane of the invention adjustable base. When engagement of the apparatus for stabilizing the wheelchair is desired, the attendant has but to remove four of the legs from stowage, (stowage being had at the rear of the adjustable base), install the two rear legs either by inserting them into the base at the rear face thereof or passing them between the spokes of the wheel into the lateral ports of the rear portion, and doing the same with the two front legs. Thus, in every case, the front legs are out-rigged, i.e. their feet are located outside the rim of the wheelchair's main wheels. Likewise can be said of the rearmost legs, with the exception that, in the alternative, the attendant may desire to rearwardly rig the back legs. Under most conditions, the laterally emplaced, outrigged-leg scheme may be used. Once the legs are installed, the attendant need only extend the front legs by actuating the extender means at the base thereof. Such actuation will lift the front edge of the base, and consequently the wheelchair, just enough so as to elevate the main wheelchair wheels above the ground. As may be readily understood by those familiar with such patient care, the attendant need only exert him or herself slightly when actuating the front leg adjusters.

Once the instant invention is applied and engaged according to this teaching, the occupied wheelchair will be rendered completely immobile and nontippable by (the motions of) the occupant. There is no need to provide main wheel braking means unless the attendant desires to immobilize the wheels. Further advantages to the instant invention may be readily ascertained by giving attention to the hereinafter detailed descriptions.

DETAILED DESCRIPTION OF THE PREFERRED EMBODIMENT

In the preferred embodiment, the invention is constructed as an adjustable, rectangular, hollow stock framework comprising a front bracket, a rear bracket and, attached thereto, two side brackets. The front and rear brackets are telescopically adjustable, and sleeves are provided to incorporate this facility. The brackets themselves are hollow rectangular steel stock and any permanent connection of the brackets is had, most readily, by welding. Those of ordinary skill may readily conceive of several materials and connection methods that might be used alternatively to acquire the preferred embodiment. The legs also comprise welded rectangular stock and are sized so as to slip snugly into the openings or ports of the base frame stock. Rectangular stock is used simply because the matching (square) geometries prevent rotation of the legs once installed into any of the base frame ports.

Figure 1:
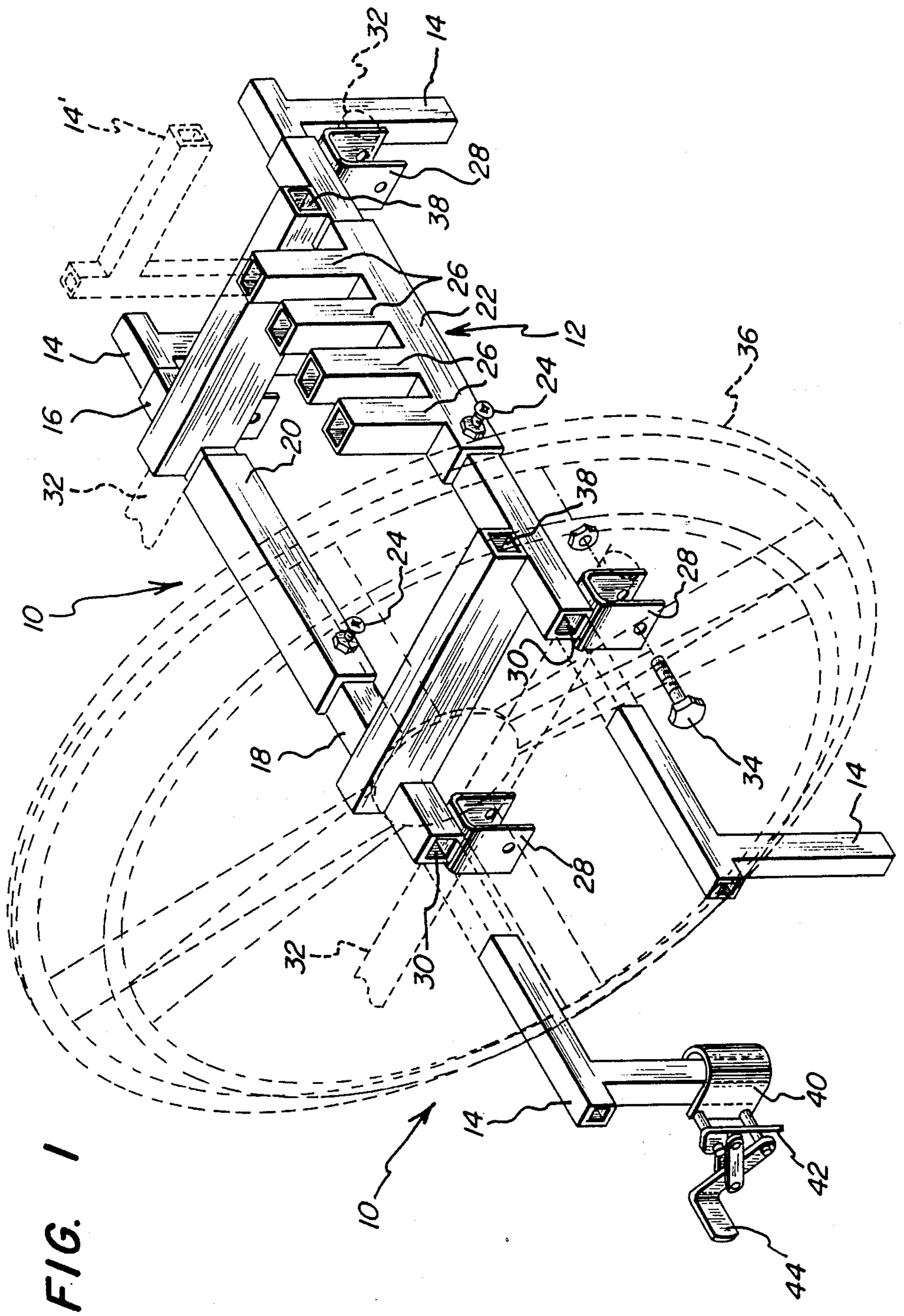
FIG. 1 is an isometric illustration of the invention, Partially exploded to detail the salient elements thereof.

Referring more particularly now to FIG. 1, the exploded isometric view of the invention 10 discloses the salient parts comprising the adjustable base frame 12 and a plurality of "L" shaped legs 14. In this embodiment, the right side of the frame 16 is joined to the left side 18 by adaptor bracket 20, at the front of the base 10, and adaptor bracket, 22 at the rear of the base. These are essentially sleeves which allow the base frame ends to be inserted thereinto, thereafter being secured by tightening of bolts 24 which act as setscrews. It will be noticed that the rear sleeve adaptor 22 is constructed with four upwardly extending tubes 26 that are provided for the stowage of legs 14, as indicated by phantom 14'. Bolt receiving brackets 28, having a general "U" shape, are rigidly affixed to the underside of the frame proximate the leg receiving apertures 30. When the invention 10 is mounted to the lower frame of a wheelchair as shown in FIG. 1 (the wheelchair bottom frame 32 is invisibly depicted herein), it is secured thereto by bolts 34. It may be readily seen that when front and rear legs 14 are inserted in the lateral ports 30 of frame members 16 and 18, they will be outside the wheelchair wheels 36 (left wheel only, shown in phantom). The alternate positioning of legs 14 is the insertion of the rear legs into the base rear face Ports 38; the front legs always remain outrigged and inserted in the base front ports 30 as depicted in FIG. 1. There is shown attached to only one of the front legs 14 the leg foot extension 40; the detailed description of which shall follow and be understood more clearly at the description of FIG. 3. Suffice it to note that, when the adjuster actuator lever 42 is rotated up or down, the pedestal portion 44 will likewise be actuated, either extending the length of leg 14 or allowing it to revert to its design length.

Figures 2, 3:
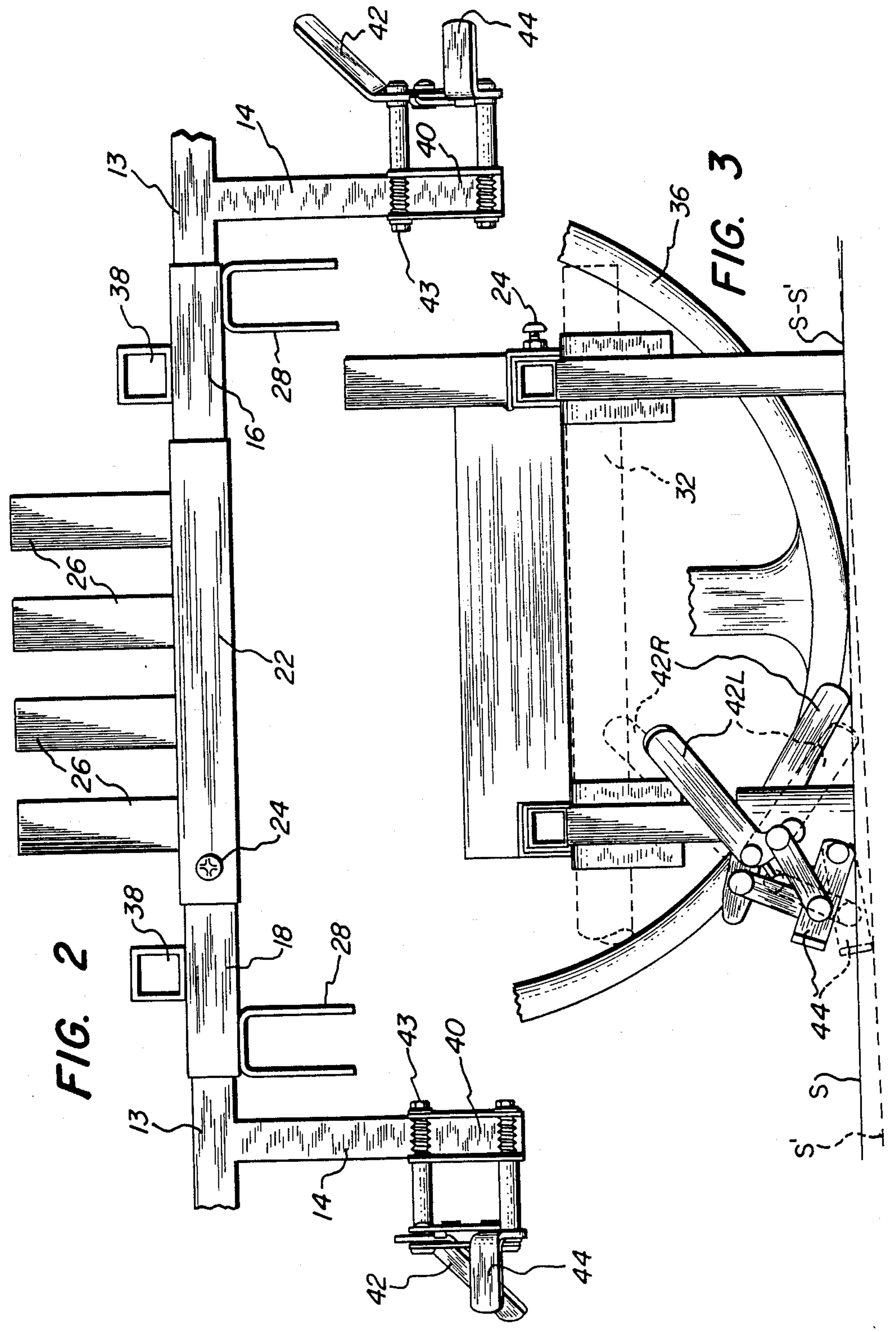
FIG. 2 is a rear elevation of the base showing only front legs installed.
FIG. 3 is a side elevation of the invention depicting its attachment to a wheelchair frame which is shown in phantom.

By the rear and side elevations depicted in FIGS. 2 and 3, respectively, the reader is made aware of the salient elements of the invention and their interconnective relationship. From the rear view of FIG. 2, one readily notes the telescoping arrangement of the base frame with left bracket 18 and with right bracket 16 coextensively joined by insertion into adaptor 22. The rear face ports 38 of the base are readily seen and it is clear that they are receptive of the arm 13 of a leg 14. The rear view of FIG. 2 also discloses that the inventor has chosen to adapt the common wheelchair braking mechanism 40 to create adjusters for extending legs 14. It should be further noted that, in FIG. 2, the same braking mechanism has been used to acquire a lever— extendable pedestal 44, by simply reversing the mounting of bolt—mounted braking mechanism 40. For example, rotating the right side lever 42R downward will extend the pedestal 44 downward; while, rotating the left side lever 42L upward will conversely move its pedestal 44 downward. Thus, by rotation (in opposite directions) of both front leg adjuster levers 42, the pedestals 44 of both adjusters 40 are caused to move in the same direction (downward). In FIG. 3, the rotations of the left and right lever are seen as 42L and 42R, respectively. The reader's attention is called to the fact that when the pedestals of the adjusters are raised, surface S will be in contact with wheel 36 and, consequently, the chair may still be moved, should the main wheels be rotated. Once the adjusters are actuated and pedestals 44 are placed in contact with the ground (with concomitant raising of the front edge of the base), wheel 36 will be elevated from the surface S; this position is denoted in FIG. 3 by the relationship between wheel 36 and surface S'.

Figure 4:
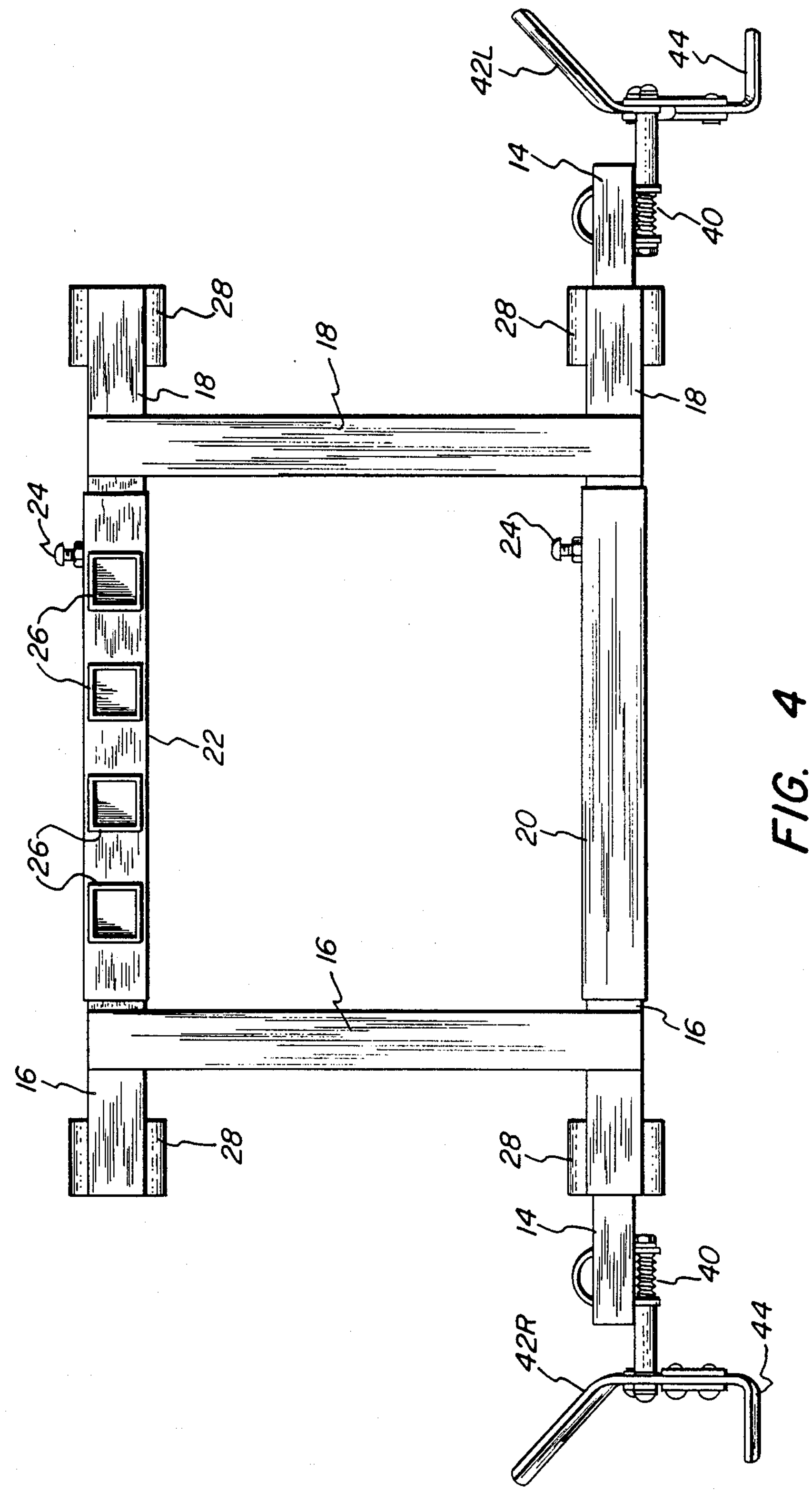
FIG. 4 is a top view of the invention.

FIG. 4, a top view of the preferred embodiment, is provided so that the reader might fully appreciate how the telescopic adaptors 20, 22 function under normal circumstances. Once brackets 28 are fitted over the lower wheelchair frame 32 (see FIGS. 1 and 3), the adaptor Portions 20 and 22 slid toward the right bracket 16, and bolt-set screws 24 tightened (biasing the adaptors 20, 22 at the right bracket 16 juncture), the entire framework 16, 18, 20, 22 is rigidified. This adjusting mechanism, as well as the conventional brake-leg adjusters 40 and brackets 28, with bolt-on apparatus 34, is a composite of expedients that has been adopted by the instant inventor; and, one of ordinary skill may readily conceive of alternate apparatus that would mechanize the teachings and concepts herein disclosed. It should be readily understood, therefore, that the concepts and teachings of the instant inventor should be construed broadly within the framework of the claims which are hereto appended.

What is claimed is:

1. A wheelchair anti-tip apparatus for mounting to the frame of the chair, and ready for rapid employment, comprising:

a base having defined front, rear and lateral portions adapted to receive insertable legs proximate the corners of said base, said base adapted for mounting to the lower frame of a wheelchair;

a plurality of legs removably insertable proximate said intersecting base portions, at least two of said legs disposed outward of the rim of the wheelchair main wheels when said base is attached to said chair and said legs are inserted therein; and height adjuster means disposed on the bottoms of the front legs of said chair, whereby when at least four of said legs are installed in said base, which is attached to a wheelchair, and the front legs of said four are extended by said adjuster means, said chair's main wheels are lifted from the contact surface and said chair is suspended between said plurality of legs in an immobile anti-tip configuration.

2. The invention of claim 1 wherein said base further comprises a plurality of stowage locations for stowing said legs proximate the rear portion of said base for when said legs are not in use.

3. The invention of claim 1 wherein said base is further adapted to receive rear legs parallel to the positioning of said front legs, said rear legs also disposable outward of said chair's main wheels.

4. The invention of claim 1 wherein said base is further adapted to receive rear legs orthogonal to the positioning of said front legs.

5. The invention of claim 1 wherein said installed legs are telescopically insertable and further are adjustable by said telescopic insertion to different lengths so as to pass through the spokes of a wheelchair and be operationally disposed outside the main wheel rims of said chair resulting in an outrigged configuration.

6. A removably mountable anti-tip apparatus for a wheelchair comprising:

base means having front, rear and side portions removeably secured coplanar to the lower rectangular frame of the wheelchair;

plural leg means removably attached to said base means near the corners of the lower rectangular frame of the wheelchair;

adjustment means attached to said leg means, said adjustment means adapted to lengthen and shorten said leg means so that the disposition of said base means, alterable in relation to the ground surface, whereby extension adjustment of said adjustment means results in the rearward tipping of the chair and lifting of the wheelchair main wheels off the ground surface.

7. A device that is removably attachable to a wheelchair frame for acquiring the capability of moving the device and the wheelchair frame unitarily in the same plane comprising:

adjustable base means receptive of a plurality of outriggable leg members;

a plurality of leg members adjustably attachable to said base means and adapted for attachment to said base means passing outside the rim of said wheelchair main wheels; and adjustment means for lengthening selected pairs of said leg members so that the base frame of said wheelchair is tilted relative to the ground surface, toward a preselected direction and predetermined extent of tilt.

* * * * *